R. J. NOAKES.
VALVE COUPLING.
APPLICATION FILED JUNE 28, 1919.

1,388,523. Patented Aug. 23, 1921.

Robert J. Noakes,
Inventor.
Attorney.

UNITED STATES PATENT OFFICE.

ROBERT J. NOAKES, OF MONTREAL, QUEBEC, CANADA, ASSIGNOR, BY DIRECT AND MESNE ASSIGNMENTS, TO CHICAGO PNEUMATIC TOOL COMPANY, OF NEW YORK, N. Y., A CORPORATION OF NEW JERSEY.

VALVE-COUPLING.

1,388,523.      Specification of Letters Patent.      Patented Aug. 23, 1921.

Application filed June 28, 1919. Serial No. 307,442.

*To all whom it may concern:*

Be it known that I, ROBERT JAMES NOAKES, a subject of the King of Great Britain, and resident of the city of Montreal, Province of Quebec, Dominion of Canada, have invented certain new and useful Improvements in Valve-Couplings; and I do hereby declare that the following is a full, clear, and exact description thereof.

Heretofore in connecting a pair of branch lines to a single pipe line a plain coupling has been controlled by a valve entirely separate from the coupling. This arrangement of parts not only required an extra valve fitting and the necessary threading of the pipe ends but added to the possibility of breakage.

The object of my invention is to provide a two line valve which combines in one integral member both coupling and valve and which consequently overcomes the disadvantages referred to above.

To this end my invention consists of a two line valve having a coupling head in the axial plane of the valve proper for connection to the intake line and a pair of integral offset coupling heads for connection to the branch lines.

For full comprehension of my invention reference must be had to the accompanying drawings in which similar reference characters indicate the same parts, and wherein.

Figure 1:
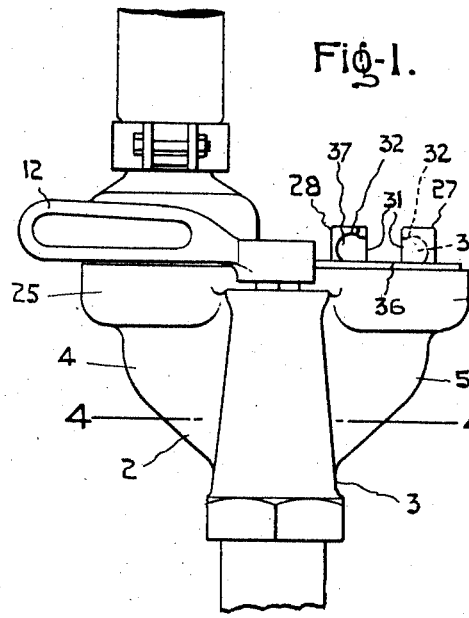
Figure 1 is a side elevation of my improved two way valve.
Figure 2:
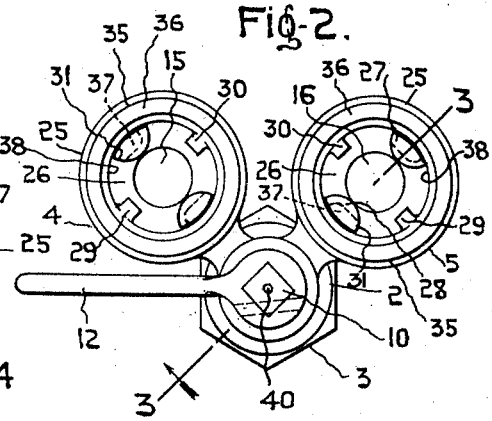
Fig. 2 is a plan view illustrating the branch coupling heads.
Figure 4:
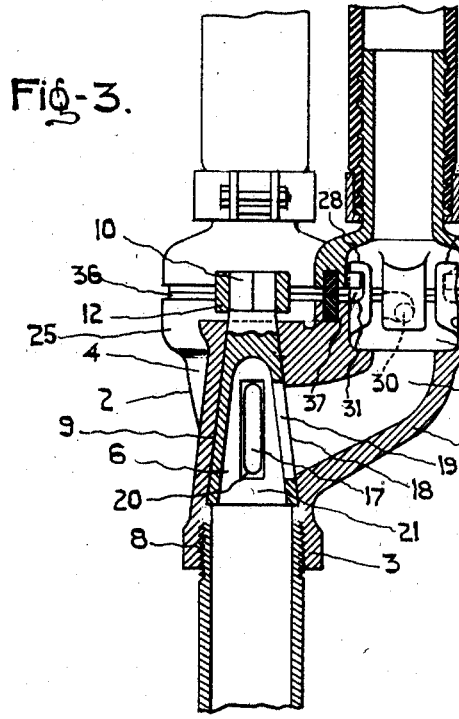
Fig. 4 is a transverse sectional view taken on line 4—4 Fig. 1.

The body or casing of the valve consists of an integral casting 2 having an inlet 3 and branch outlets 4 and 5 offset from the axial line of the inlet port. The valve proper which is of substantially conical form is indicated at 6 and its axial plane coincides with the plane of the intake pipe line, the casing being internally screw-threaded as at 8 to receive the latter. The valve case presents a chamber 9 of conical form to rotatably receive the valve proper and the smaller end of such chamber has an opening sufficient to permit the squared end 10 of the valve proper to project therethrough. A lever 12 for opening and closing the valve is rigidly keyed to this squared end.

The branch outlets 4 and 5 extend at right angles to each other and contain passages 15 and 16 respectively, the latter terminating in oblong ports 17 and 18 opening into the valve chamber, the length of the ports being parallel to the axial plane of the valve. Ports 19 and 20 in the valve proper are adapted to register with the first mentioned ports and effect communication between the passages and the valve chamber 21 within the valve proper.

Figure 3:
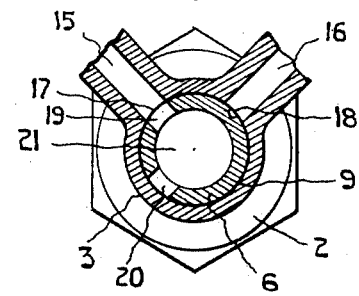
Fig. 3 is a longitudinal sectional view taken on line 3—3 Fig. 2.
Figure 5:
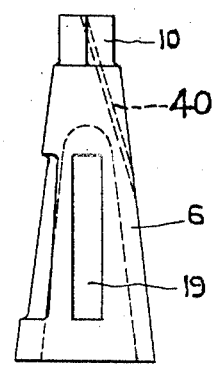
Fig. 5 is a detail elevation of the valve proper.

A universal coupling head 25 is formed integrally with each of the outlets 4 and 5. This head is of relatively large diameter to provide a chamber 26 sufficiently large to contain, while maintaining a clear passage for the air or steam, a pair of diametrically oppositely positioned lugs 27 and 28 and teats 29 and 30 located diametrically opposite each other and in a plane at right angles to the plane of the lugs. The lugs and teats are formed inegrally with the inner wall 38 of the head. This coupling head is adapted to be connected to a head of identically the same construction as indicated in Fig. 3, the lugs on one head engaging the teats on the other and vice versa. In order that the lugs may become moved into locking engagement with the teats by a slight turn a socket 37 is formed in the outer face of each lug and is extended laterally to constitute an opening 31 permitting the entry of the teat thereinto, and the inclined surface 32 causes the coupling heads to come into tight contact when connected. A circumferential groove 35 is formed in each head and contains an annular gasket 36 which projects out of the groove and the gaskets of each pair of coupled heads being in tight contact. The joint is tightened when the internal pressure increases as the gaskets are caused to expand.

In order that the branch lines may be relieved of pressure when the valve is closed, the valve proper has a blow-off passage 40 therein extending from the squared end of the former to a point at which it will effect communication successively with the passages 15 and 16 as the valve is turned from open to closed positions.

What I claim is as follows:

1. A valve coupling for connecting an intake pipe line and a pair of branch lines; said coupling consisting of a unitary integral casting including a pair of offset outlets for connection to the branch lines, a valve within the casting and located on the axial line of the intake pipe line and controlling the outlets, and a blow-off passage in said valve adapted to successively relieve the branch lines of pressure when the valve is moved from open to closed positions.

2. A valve coupling for connecting a single pipe line to a plurality of lines extending parallel to said single line, said coupling consisting of a casting having a conical valve chamber, the opposite ends of said chamber being open, the larger end communicating with said single pipe line, a plurality of passages radiating from said chamber, each of said passages being offset to locate its outer end in alinement with one of said plurality of lines, and a conical valve rotatably fitting within said chamber for controlling said passages and having its smaller end projecting through and closing the smaller end of the chamber, said projecting end enabling the valve to be turned.

3. A valve coupling for connecting a single pipe line to a plurality of lines extending parallel to said single line, said coupling consisting of a casting having a conical valve chamber, the opposite ends of said chamber being open, the larger end communicating with said single pipe line, a plurality of passages radiating from said chamber, each of said passages being offset to locate its outer end in alinement with one of said plurality of lines, said outer end being of substantially circular cross section and the inner end being of substantially oblong cross section with the length of the oblong extending substantially parallel to the axis of the valve chamber and a hollow conical valve rotatably fitting within said chamber for controlling said passages, said valve having a plurality of longitudinally disposed oblong openings therein adapted to effect communication between the passages and said valve chamber, the smaller end of the valve projecting through and closing the smaller end of the chamber, said projecting end enabling the valve to be turned.

4. A valve coupling for connecting a single pipe line to a plurality of lines extending parallel to said single line, said coupling consisting of a casting having a conical valve chamber, the opposite ends of said chamber being open, the larger end communicating with said single pipe line, a plurality of passages radiating from said chamber, each of said passages being offset to locate its outer end in alinement with one of said plurality of lines, said outer end being of substantially circular cross section and the inner end being of substantially oblong cross section with the length of the oblong extending substantially parallel to the axis of the valve chamber, and a hollow conical valve rotatably fitting within said chamber for controlling said passages, said valve having a plurality of longitudinally disposed oblong openings therein adapted to effect communication between the passages and said valve chamber, the smaller end of the valve projecting through and closing the smaller end of the chamber, said projecting end enabling the valve to be turned, and a blow-off passage in said valve adapted to successively relieve said plurality of lines of pressure when the valve is moved from open to closed position.

In testimony whereof I have signed my name to this specification in the presence of two witnesses.

ROBERT J. NOAKES.

Witnesses:
GORDON G. COOKE,
WILLIAM J. C. HEWETSON.